(12) United States Patent
Schmidt

(10) Patent No.: US 9,135,750 B2
(45) Date of Patent: Sep. 15, 2015

(54) TECHNIQUE FOR FILLING HOLES IN A THREE-DIMENSIONAL MODEL

(71) Applicant: AUTODESK, INC., San Rafael, CA (US)

(72) Inventor: Ryan Michael Schmidt, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 227 days.

(21) Appl. No.: 13/786,250

(22) Filed: Mar. 5, 2013

(65) Prior Publication Data

US 2014/0253551 A1  Sep. 11, 2014

(51) Int. Cl.
*G06T 15/00* (2011.01)
*G06T 17/20* (2006.01)

(52) U.S. Cl.
CPC ................ *G06T 17/20* (2013.01); *G06T 15/00* (2013.01)

(58) Field of Classification Search
CPC ............................... G06T 17/20; G06T 15/00
USPC ......... 345/419, 420, 423, 427, 428, 441, 581, 345/582, 584, 606; 382/285; 703/2
See application file for complete search history.

(56) References Cited

U.S. PATENT DOCUMENTS

| 8,015,125 B2* | 9/2011 | Regli et al. ................ 706/12 |
| 8,405,659 B2* | 3/2013 | Lakshmanan et al. ........ 345/427 |
| 2006/0267978 A1* | 11/2006 | Litke et al. ................ 345/419 |
| 2009/0303230 A1* | 12/2009 | Liu et al. .................. 345/419 |

OTHER PUBLICATIONS

B Allen, B. Curless and Z. Popovic, "The space of human body shapes: reconstruction and parameterization from range scans", ACM Transactions on Graphics 22, 3 (Jul. 2003), 587-594.*
V. Kraevoy and A. Sheffer, "Cross-parameterization and compatible remeshing of 3D models", ACM Transactions on Graphics 23, 3 (Aug. 2004), pp. 861-869.*

* cited by examiner

*Primary Examiner* — Phu K Nguyen
(74) *Attorney, Agent, or Firm* — Artegis Law Group, LLP

(57) ABSTRACT

A mesh repair engine is configured to repair a hole in a three-dimensional (3D) model by (i) filling the hole with a rough mesh, (ii) refining the rough mesh, (iii) collapsing the refined mesh, (iv) refining the collapsed mesh, (v) flattening the refined, collapsed mesh, and then (vi) deforming the flattened mesh into a 3D surface that smoothly fills the hole in the 3D model. One advantage of the disclosed repair engine and associated hole repair technique is that the mesh repair engine is capable of generating polygons that fill regions of a 3D model that are not defined. Consequently, an end-user of the mesh repair tool is able to generate watertight 3D models from previously incomplete and non-watertight 3D models.

20 Claims, 12 Drawing Sheets

TECHNIQUE FOR FILLING HOLES IN A THREE-DIMENSIONAL MODEL

BACKGROUND OF THE INVENTION

1. Field of the Invention

The present invention generally relates to computer graphics and, more specifically, to a technique for filling holes in a three-dimensional model.

2. Description of the Related Art

A conventional rendering application is typically configured to generate a polygonal mesh that represents the surface of an object within a three-dimensional (3D) environment. A given polygonal mesh could resemble a real-world object such as a human being, or a virtual object such as a video game character. A polygonal mesh generated by a conventional rendering application oftentimes includes "holes" where the surface of the object is not defined by the rendering application. In some cases, such holes are intentional (i.e., the object actually has a hole and the surface is not meant to be defined), although in other cases, such holes are the result of improper or unsuccessful generation of the polygonal mesh.

For example, in the field of three-dimensional scanning, a rendering application may receive input from a 3D scanner that reflects a scanned real-world object, and the rendering application may then generate a polygonal mesh that represents that real-world object. However, conventional rendering applications are usually not capable of generating portions of the polygonal mesh corresponding to regions of the real-world object that are not visible to the 3D scanner. In such situations, those regions may simply appear as a "hole" in the polygonal mesh.

A conventional rendering application may attempt to repair the hole in the polygonal mesh by adding a fill surface to the mesh that is composed of additional polygons. However, a fill surface generated by a conventional rendering application often has a physical shape and overall appearance that is inconsistent with the physical characteristics of the polygonal mesh as a whole. Further, conventional rendering applications typically cannot generate fill surfaces for holes having arbitrary shapes, and may thus fail to generate fill meshes for more "complicated" holes. In addition, such applications typically require significant time in order to compute fill surfaces, resulting in a poor user experience.

As the foregoing illustrates, what is needed in the art is a more effective technique for filling holes in a polygonal mesh.

SUMMARY OF THE INVENTION

One embodiment of the invention includes a computer-implemented method for filling a hole in a three-dimensional (3D) model, including identifying the hole in the 3D model, generating a refined quasi-developable surface that is disposed within the hole in the 3D model, generating a two-dimensional (2D) surface based on the refined quasi-developable surface, and deforming the 2D surface into a 3D surface that fills the hole in the 3D model.

One advantage of the disclosed technique is that polygons may be generated that fill regions of the 3D model that are not defined. Consequently, an end-user is able to generate watertight 3D models from previously incomplete and non-watertight 3D models.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
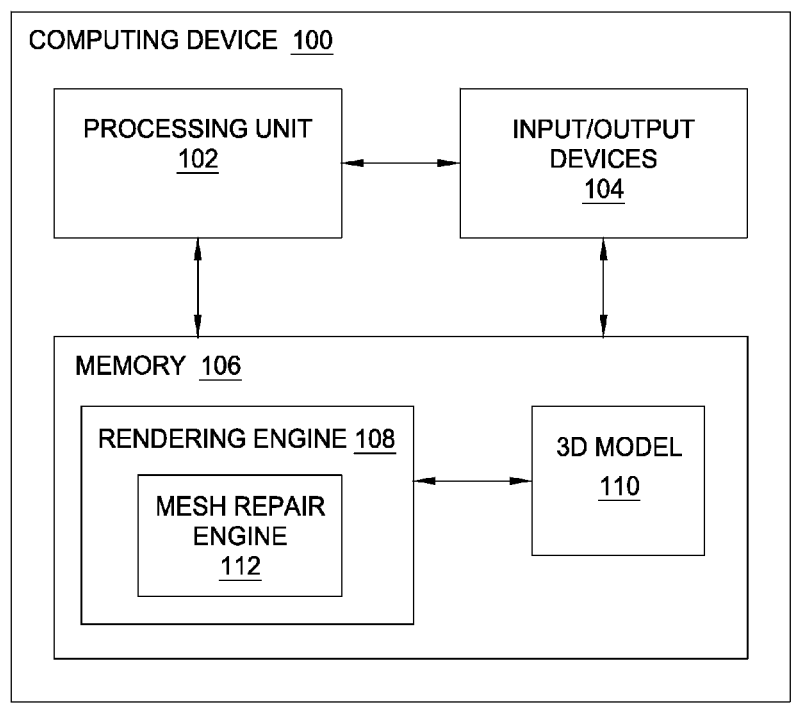
FIG. 1 illustrates a computing device configured to implement one or more aspects of the present invention.

FIG. 1 illustrates a computing device 100 configured to implement one or more aspects of the present invention. As shown, computing device 100 includes a processing unit 102 coupled to input/output (I/O) devices 104 and to a memory 106. Processing unit 102 may be a central processing unit (CPU), a graphics processing unit (GPU), or a combination of different processing units, such as a CPU configured to operate in conjunction with a GPU. In general, processing unit 102 may be any technically feasible hardware unit capable of processing data and/or executing software applications.

I/O devices 104 are also coupled to memory 106 and may include devices capable of receiving input, such as a keyboard, a mouse, a video camera, a three-dimensional (3D) scanner, and so forth, as well as devices capable of providing output, such as a display device, a speaker, and so forth. Additionally, I/O devices may include devices capable of both receiving input and providing output, such as a touchscreen, a universal serial bus (USB) port, and so forth. I/O devices 104 may be configured to receive various types of input from an end-user of computing device 100, and to also provide various types of output to the end-user of computing device 100.

Memory 106 is configured to store data and may include a hard disk, a random access memory (RAM) module, a flash memory unit, or any other type of memory unit or combination thereof. Processing unit 102 and I/O devices 104 are configured to read data from and write data to memory 106. Memory 106 includes a rendering engine 108 and a 3D model 110. 3D model 110 is a mathematical model of a 3D object, and may include a polygonal mesh, a point cloud, a wireframe model, or a manifold, among other types of mathematical models. In practice, 3D model 110 includes a polygonal mesh composed of triangles. 3D model could represent a real-world object, such as, for example, a human being, or could also represent a virtual object, such as, e.g., a video game character. In one embodiment, 3D model 110 is generated based on data received from a 3D scanner within I/O devices 104 and represents a scanned, real-world object.

Rendering engine 108 is a software application configured to generate and/or modify 3D model 110. Rendering engine 108 is also configured to render pixels that represent 3D model 110 to a display device included within I/O devices 104. Rendering engine 108 may perform various other operations with 3D model 110, including texture mapping and mesh transformation operations, and may also receive user input specifying different modifications to be made to 3D model 110. Rendering engine 108 includes a mesh repair engine 112 that is configured to repair holes in 3D model 110 by filling those holes with polygons.

3D model 110 may include holes for a variety of reasons. For example, in situations where 3D model 110 is generated by a 3D scanner, regions of 3D model 110 that are not visible to the 3D scanner may not be defined, and may thus appear as holes in 3D model 110. Mesh repair engine 112 is configured to identify such holes and to generate polygons that fill those holes, thereby causing 3D model 110 to appear as a continuous surface. A technique for repairing 3D model 110 implemented by mesh repair engine 112 is discussed in greater detail below in conjunction with FIGS. 2-9.

Figure 2:
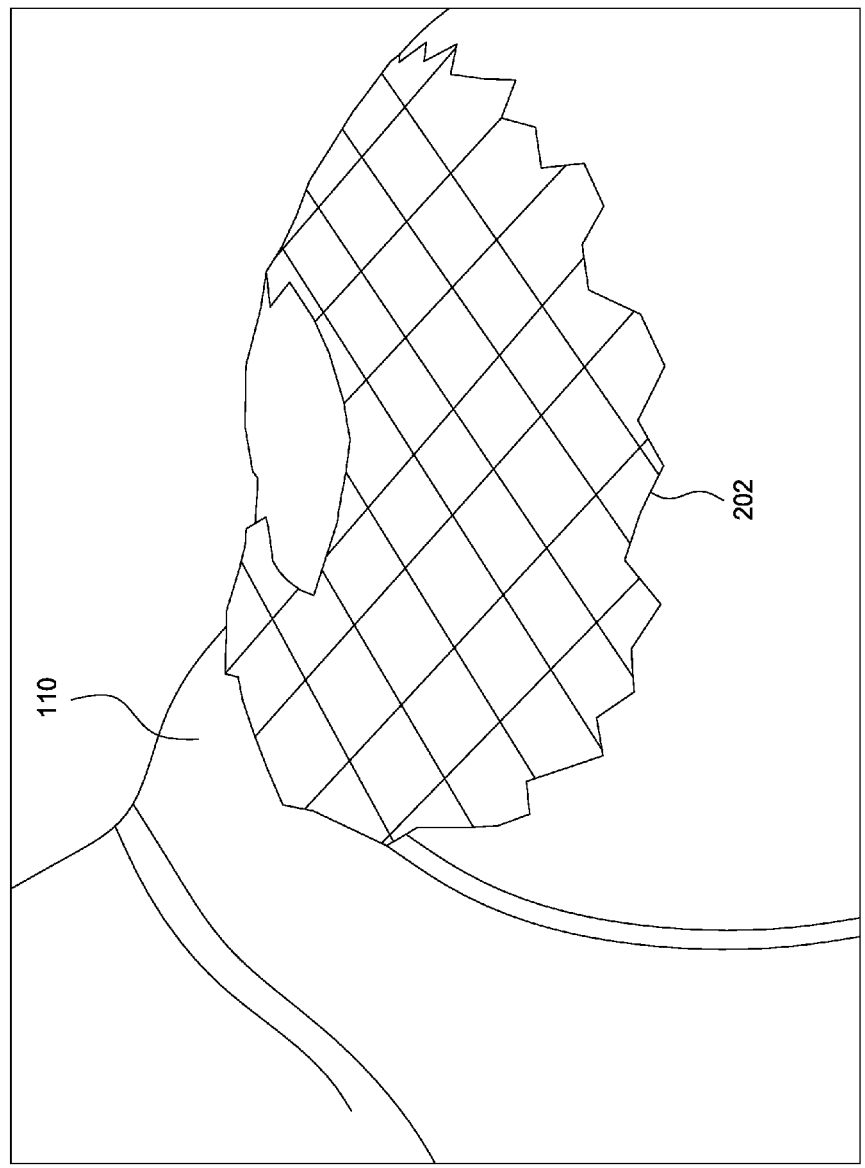
FIG. 2 is a conceptual diagram that illustrates a hole in a polygonal mesh, according to one embodiment of the invention.

FIG. 2 is a conceptual diagram that illustrates a hole 202 in 3D model 110, according to one embodiment of the invention. As shown, 3D model 110 is a semi-continuous surface of polygons that includes a region not defined by any polygons, i.e. hole 202. Hole 202 may be surrounded by a collection of boundary vertices included within 3D model 110 that represent the boundary of hole 202. In practice, 3D model 110 may be a collection of interconnected triangles, such as, e.g., a triangular mesh, and the boundary of hole 202 may be a collection vertices and edges that connect those vertices to one another. Mesh repair engine 112, shown in FIG. 1, is configured to introduce additional edges and/or triangles into 3D model 110 in order to fill hole 202 by performing a multi-step procedure. The first step in that procedure is discussed in greater detail below in conjunction with FIG. 3.

Figure 3:
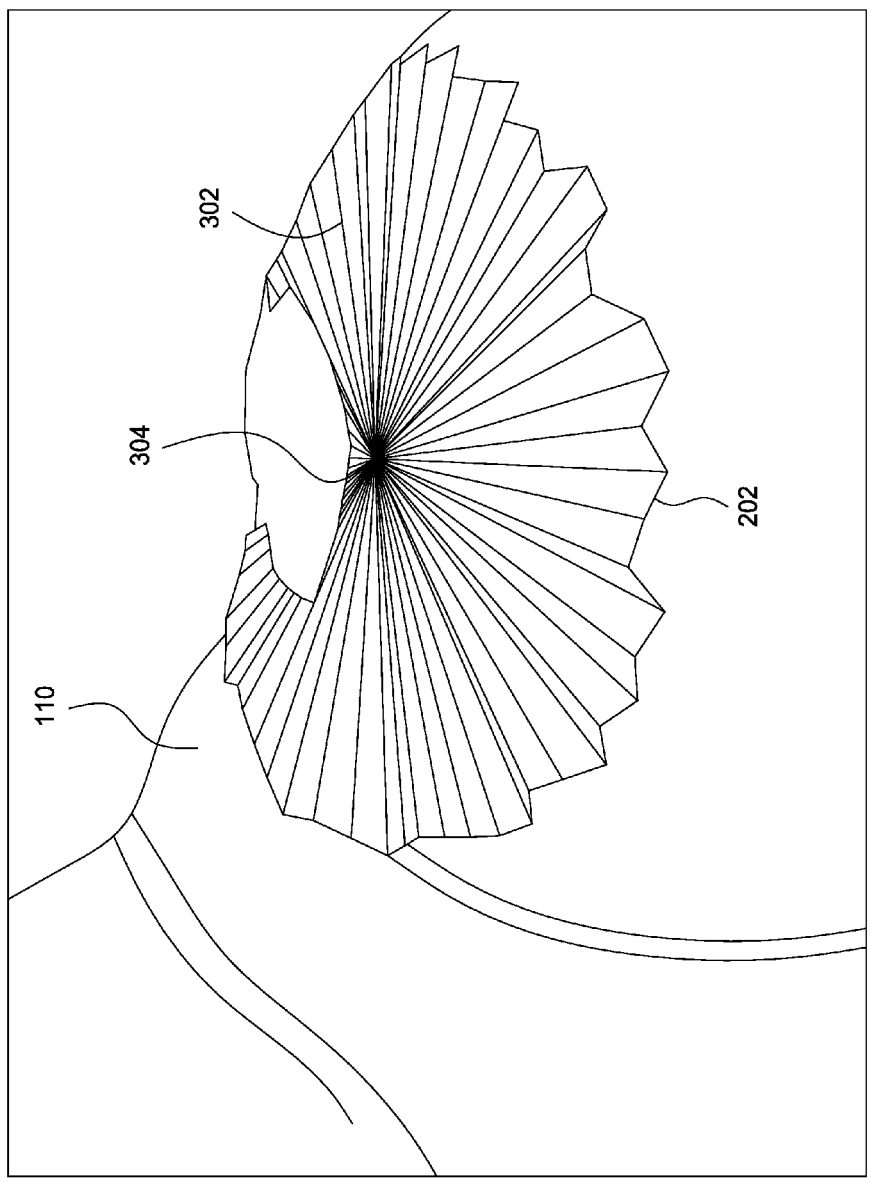
FIG. 3 is a conceptual diagram that illustrates a rough mesh, according to one embodiment of the invention.

FIG. 3 is a conceptual diagram that illustrates a rough mesh 302, according to one embodiment of the invention. As shown, rough mesh 302 is disposed within hole 202 in 3D model 110. Mesh repair engine 112 is configured to generate rough mesh 302 as a first step in the multi-step procedure for repairing holes in 3D model 110, mentioned above in conjunction with FIG. 2. Rough mesh 302 may be any surface that approximately fills hole 202, although in practice, rough mesh 302 is a triangle fan such as that shown in FIG. 3.

Mesh repair engine 112 is configured to generate rough mesh 302 by first approximating the center of hole 202, shown in FIG. 3 as center 304. Mesh repair engine 112 could locate center 304, for example, by computing 3D coordinates sufficiently equidistant from the 3D coordinates of vertices associated with the boundary of hole 202. Mesh repair engine 112 may then generate rough mesh 302 by introducing edges into 3D model 110 that connect center 304 to each of those boundary vertices. In practice, mesh repair engine 112 could implement any technically feasible approach for generating a "rough" mesh that approximately fills hole 202. Mesh repair engine 112 may then refine rough mesh 302, as discussed below in greater detail below in conjunction with FIG. 4.

Figure 4:
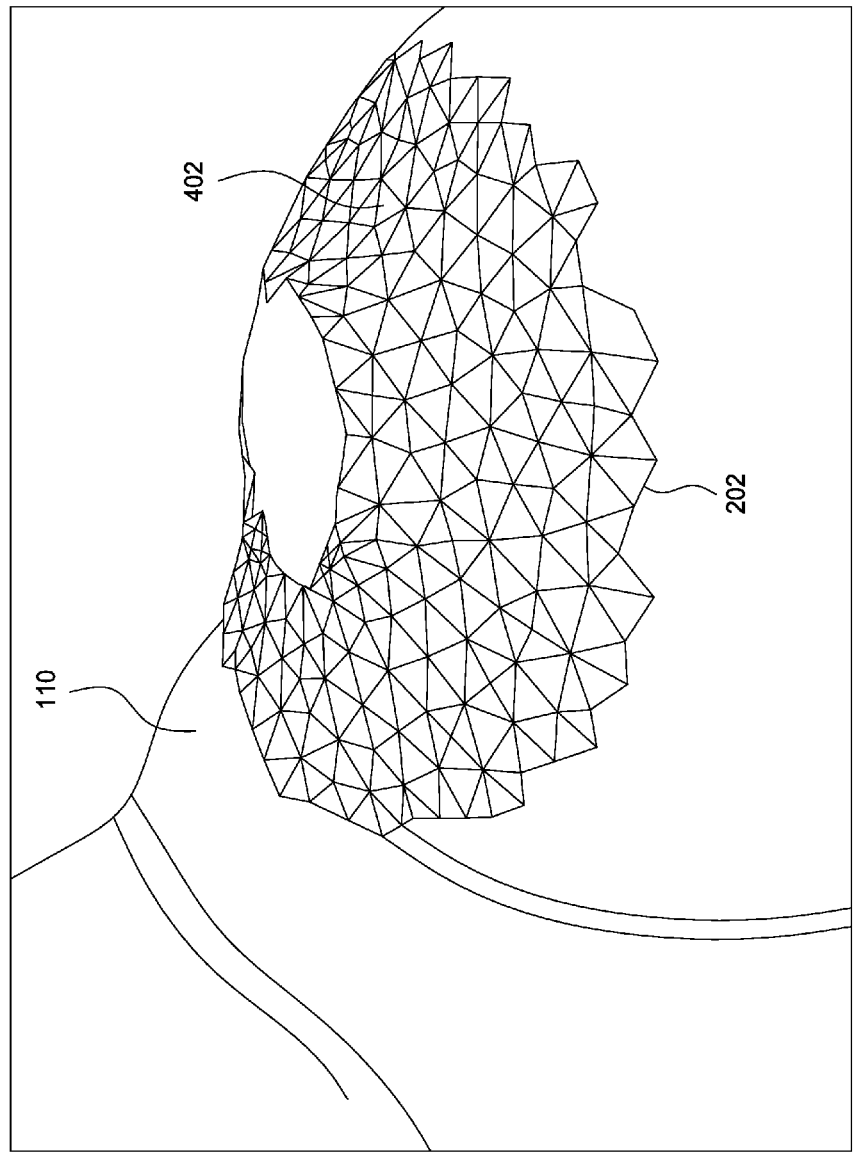
FIG. 4 is a conceptual diagram that illustrates a dynamically refined rough mesh, according to one embodiment of the invention.

FIG. 4 is a conceptual diagram that illustrates a dynamically refined rough mesh 402, according to one embodiment of the invention. As shown, dynamically refined rough mesh 402 is disposed within hole 202 in 3D model 110. Mesh repair engine 112 is configured to generate dynamically refined rough mesh 402 by decomposing each triangle within rough mesh 302 shown in FIG. 3 into a collection of additional, smaller triangles. Mesh repair engine 112 may iteratively refine rough mesh 302 by decomposing a given triangle into several smaller triangles, and then decomposing those smaller triangles into even smaller triangles.

Mesh repair engine 112 may perform this refinement process iteratively until each of the triangles within dynamically refined rough mesh 402 meets certain criteria. In one embodiment, mesh repair engine 112 iteratively refines rough mesh 302 until each triangle within that mesh is approximately equilateral and of similar size to the other triangles within the mesh, thereby generating dynamically refined rough mesh 402. Mesh repair engine 112 then simplifies dynamically refined rough mesh 402 by causing that mesh to be substantially flatter, as discussed below in greater detail below in conjunction with FIG. 5.

Figure 5:
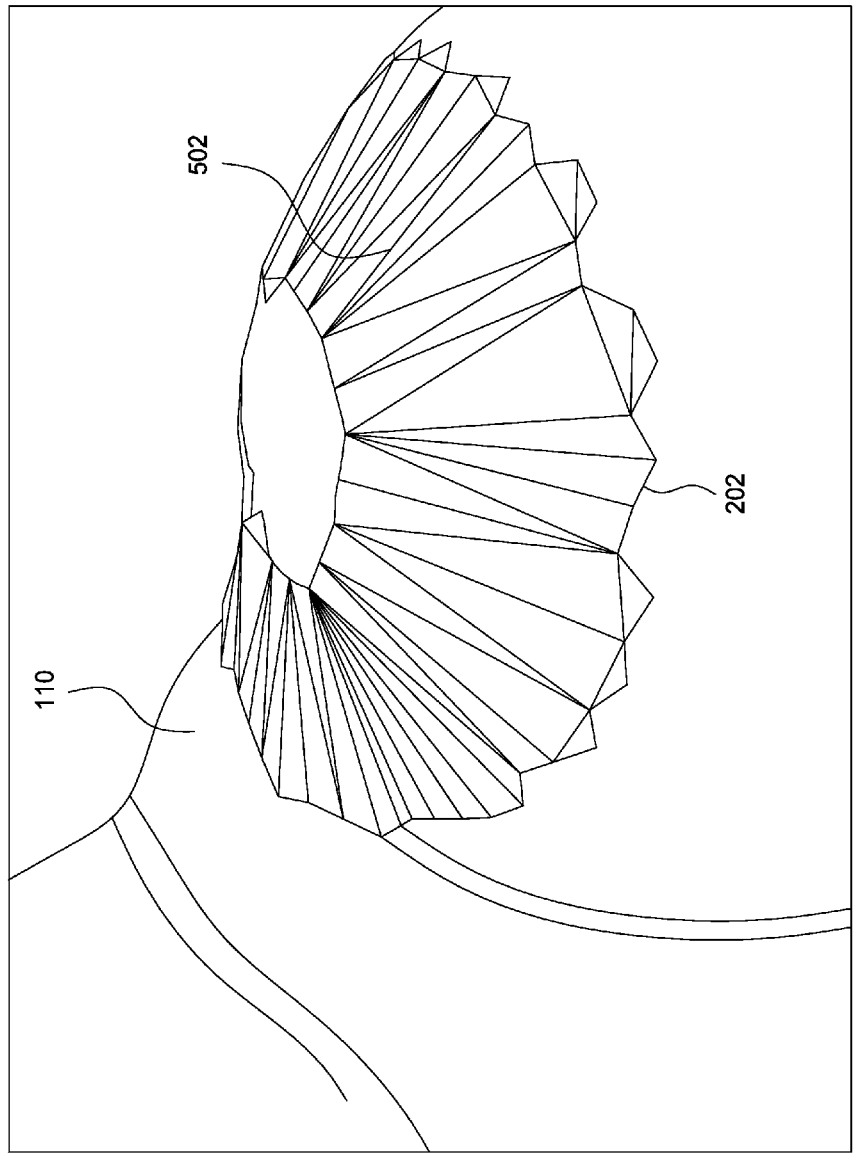
FIG. 5 is a conceptual diagram that illustrates a quasi-developable mesh, according to one embodiment of the invention.

FIG. 5 is a conceptual diagram that illustrates a quasi-developable mesh 502, according to one embodiment of the invention. As shown, quasi-developable mesh 502 is disposed within hole 202 in 3D model 110. Mesh repair engine 112 is configured to generate quasi-developable mesh 502 by collapsing triangles of dynamically refined rough mesh 402 shown in FIG. 4 into larger triangles. In doing so, mesh repair engine 112 may perform edge-collapse operations with edges of dynamically refined rough mesh 402 and/or edge-flip operations with those edges. Mesh repair engine 112 may also alternate between performing edge-collapse operations and edge-flip operations.

In one embodiment, mesh repair engine 112 may only perform a given edge-flip operation when performing such an operation results in a "flatter" mesh. For example, mesh repair engine 112 could identify two triangles that share an edge, and flip one of those triangles only when doing so causes the face normals of the two triangles to have a smaller angle relative to one another. By performing the edge-collapse and edge-flip operations in the fashion described above, mesh repair engine 112 may transform dynamically refined rough mesh 402 shown in FIG. 4 into quasi-developable mesh 502 shown in FIG. 5.

In practice, quasi-developable mesh 502 shown in FIG. 5 may approximate a developable surface. Mesh repair engine 112 could also implement any other technically feasible approach for transforming dynamically refined rough mesh 402 into a developable or a quasi-developable surface such as that shown in FIG. 5. Mesh repair engine 112 may then refine quasi-developable mesh 502, as discussed below in greater detail below in conjunction with FIG. 6.

Figure 6:
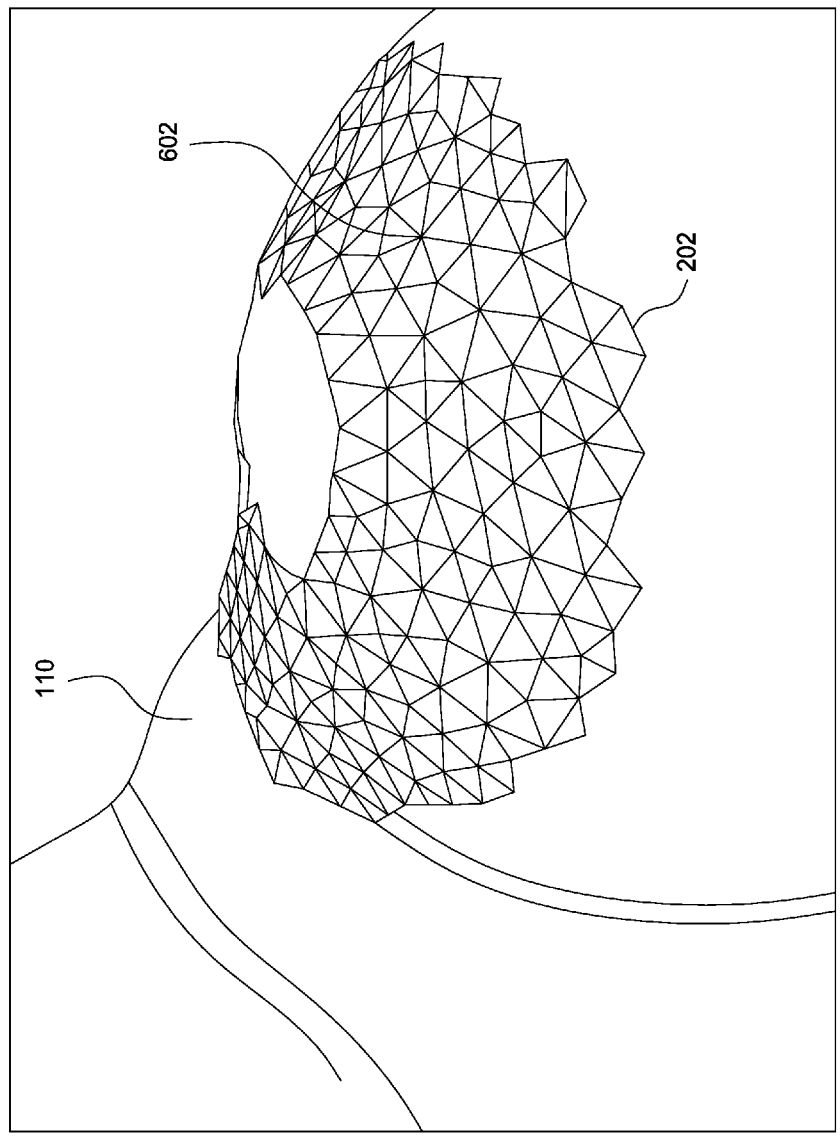
FIG. 6 is a conceptual diagram that illustrates a dynamically refined quasi-developable mesh, according to one embodiment of the invention.

FIG. 6 is a conceptual diagram that illustrates a dynamically refined quasi-developable mesh 602, according to one embodiment of the invention. As shown, quasi-developable mesh 602 is disposed within hole 202 in 3D model 110. Mesh repair engine 112 is configured to generate dynamically refined quasi-developable mesh 602 by refining quasi-developable mesh 502 shown in FIG. 5. In practice, mesh repair engine 112 may implement a similar mesh refinement process as that described above in conjunction with FIG. 4 in order to generate dynamically refined quasi-developable mesh 602.

Specifically, mesh repair engine 112 is configured to decompose each triangle within quasi-developable mesh 502 shown in FIG. 5 into a collection of additional, smaller triangles. Mesh repair engine 112 may also be configured to decompose a given triangle of quasi-developable mesh 502 into several smaller triangles, and then decompose those smaller triangles into even smaller triangles. Mesh repair engine 112 may perform this refinement process iteratively until each of the triangles within dynamically refined quasi-developable mesh 602 meets certain criteria, again, in similar fashion as described above in conjunction with FIG. 4. Mesh repair engine 112 then parameterizes dynamically refined quasi-developable mesh 602, as described in greater detail below in conjunction with FIG. 7.

Figure 7:
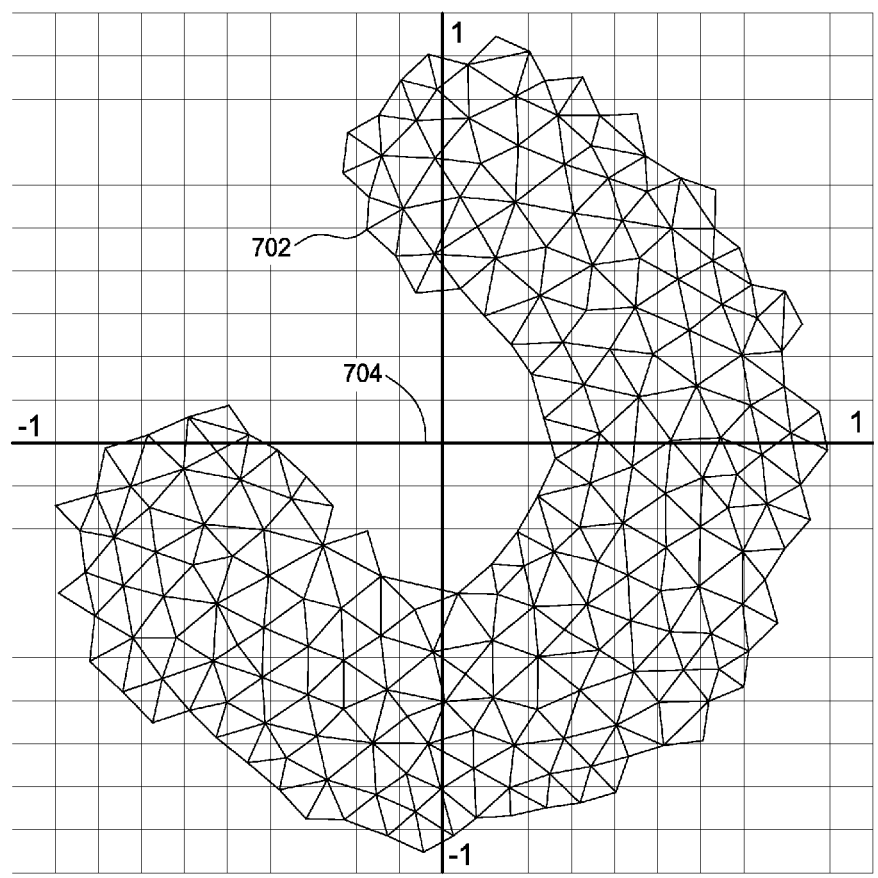
FIG. 7 is a conceptual diagram that illustrates a flattened two-dimensional (2D) mesh, according to one embodiment of the invention.

FIG. 7 is a conceptual diagram that illustrates a flattened two-dimensional (2D) mesh 702, according to one embodiment of the invention. As shown, flattened 2D mesh 702 is disposed on a set of perpendicular axes 704. Mesh repair engine 112 is configured to generate flattened 2D mesh 702 by computing a planar parameterization of dynamically refined quasi-developable mesh 602 shown in FIG. 6 using a conformal map. In general, mesh repair engine 112 generates flattened 2D mesh 702 so that flattened 2D mesh 702 locally approximates the 3D surface of dynamically refined quasi-developable mesh 602. Mesh repair engine 112 then deforms flattened 2D mesh 702 into a 3D mesh that smoothly fills hole 202, as discussed in greater detail below in conjunction with FIG. 8A.

Figure 8A:
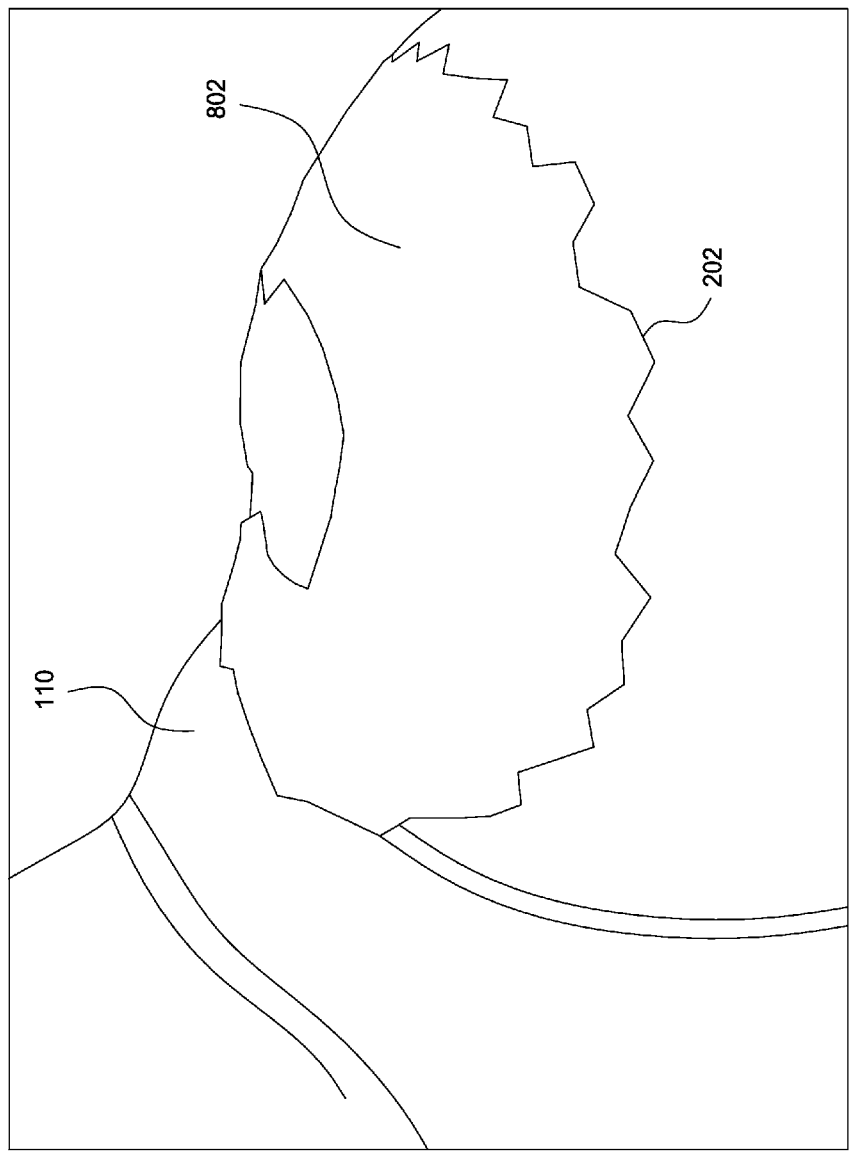
FIGS. 8A-8D are conceptual diagrams that each illustrates a three-dimensional (3D) mesh, according to one embodiment of the invention.

FIG. 8A is a conceptual diagram that illustrates a 3D mesh 802, according to one embodiment of the invention. As shown, 3D mesh 802 is disposed within hole 202 in 3D model 110. Mesh repair engine 112 generates 3D mesh 802 by deforming flattened 2D mesh 702 shown in FIG. 7 into three dimensions. In doing so, mesh repair engine 112 places each boundary vertex of flattened 2D mesh 702 at a 3D position that approximately coincides with a boundary vertex of hole 202. Mesh repair engine 112 then projects each interior vertex of flattened 2D mesh 702 into three dimensions by implementing a "mean-value coordinates" approach, as discussed below.

For a given interior vertex of flattened 2D mesh 702, mesh repair engine 112 generates an estimated 3D position of the interior vertex relative to each different boundary vertex. For a given estimate, mesh repair engine 112 also computes a weight value for that estimate based on the spatial relationship between the given interior vertex and the boundary vertex associated with the estimate. Mesh repair engine 112 then computes a weighted average of the various different estimates to provide a 3D position for the interior vertex. In this fashion, mesh repair engine 112 computes a 3D position for each vertex of flattened 2D mesh 702, thereby generating 3D mesh 802.

Figure 8B:
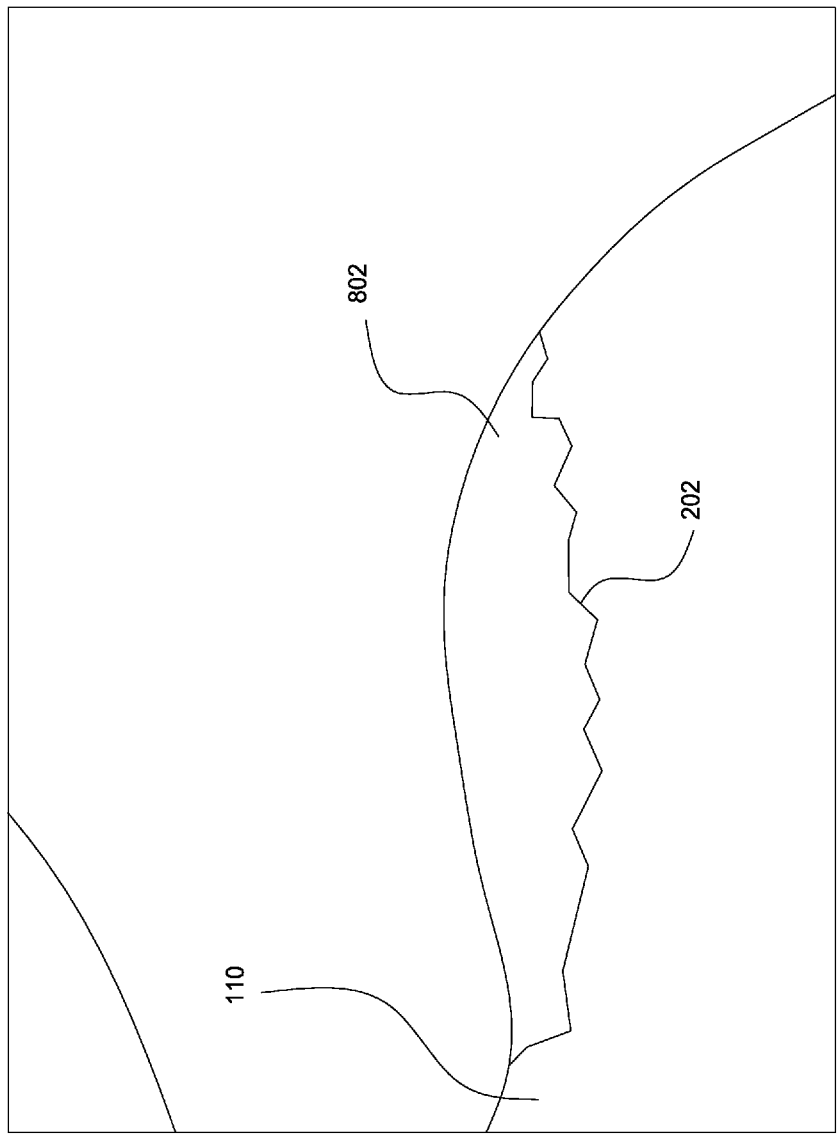

FIG. 8B illustrates a profile view of 3D mesh 802. As shown, 3D mesh 802 smoothly fills hole 202 in 3D model 110. Mesh repair engine 112 is configured to modify flattened 2D mesh 702 discussed above prior to deforming that mesh into three dimensions in order to generate 3D meshes having a variety of different shapes and/or profiles, as discussed in greater detail below in conjunction with FIGS. 8C-8D.

Figure 8C:
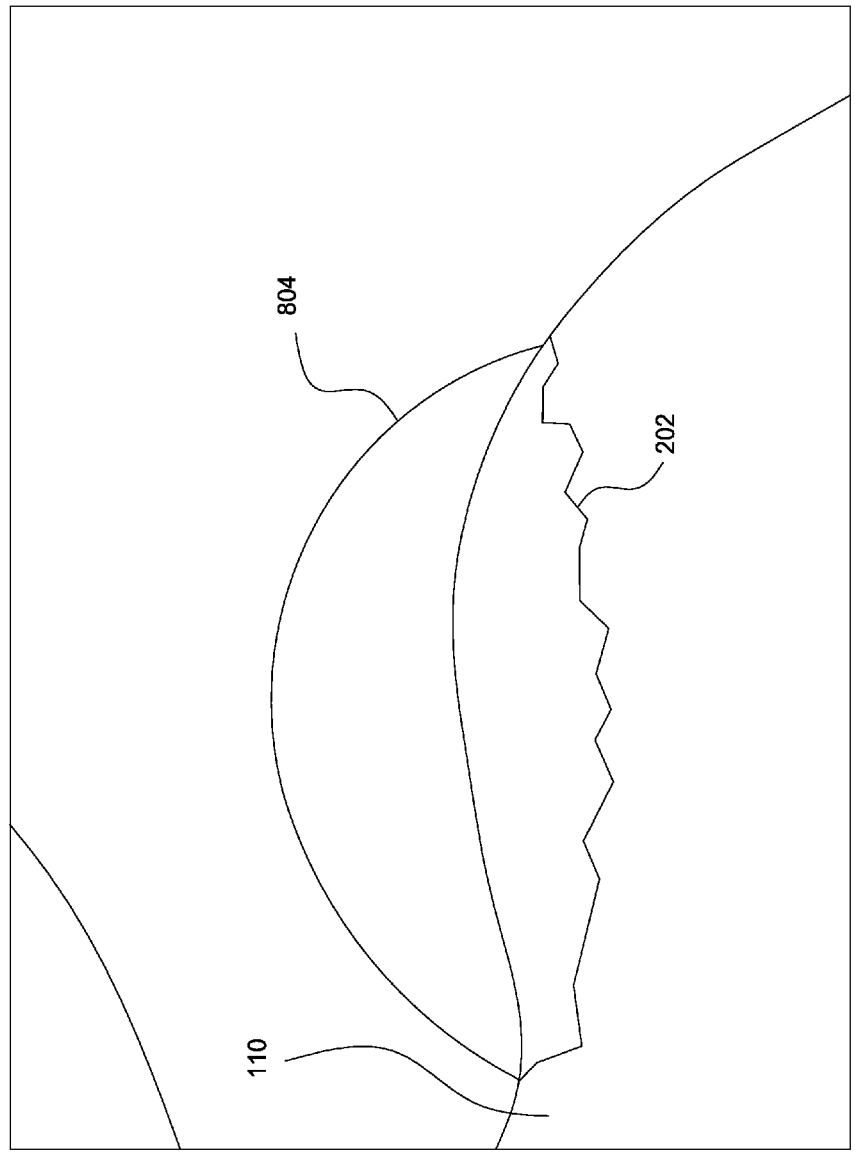

FIG. 8C is a conceptual diagram that illustrates a 3D mesh 804. As shown, 3D mesh 804 is disposed within hole 202 of 3D model 110. Mesh repair engine 112 is configured to generate 3D mesh 804 by scaling flattened 2D mesh 702 shown in FIG. 7, and then deforming that scaled mesh into three dimensions. For example, mesh repair engine 112 could increase the lengths of certain edges within flattened 2D mesh 702, thereby causing that mesh to have a larger area. Mesh repair engine 110 could then deform the scaled, flattened 2D mesh into three dimensions using the technique described above in conjunction with FIG. 8A. However, since the scaled, flattened 2D mesh has a larger area, the resultant 3D mesh 804 would assume a different shape and profile compared to 3D mesh 802.

Mesh repair engine 112 is configured to scale flattened 2D mesh using a variety of different techniques, and may increase or decrease any of the edges within flattened 2D mesh 702 prior to deforming that mesh into three dimensions. Mesh repair engine 112 may also modify 3D mesh 802 directly in order to generate additional 3D meshes having different shapes, as discussed in greater detail below in conjunction with FIG. 8D.

Figure 8D:
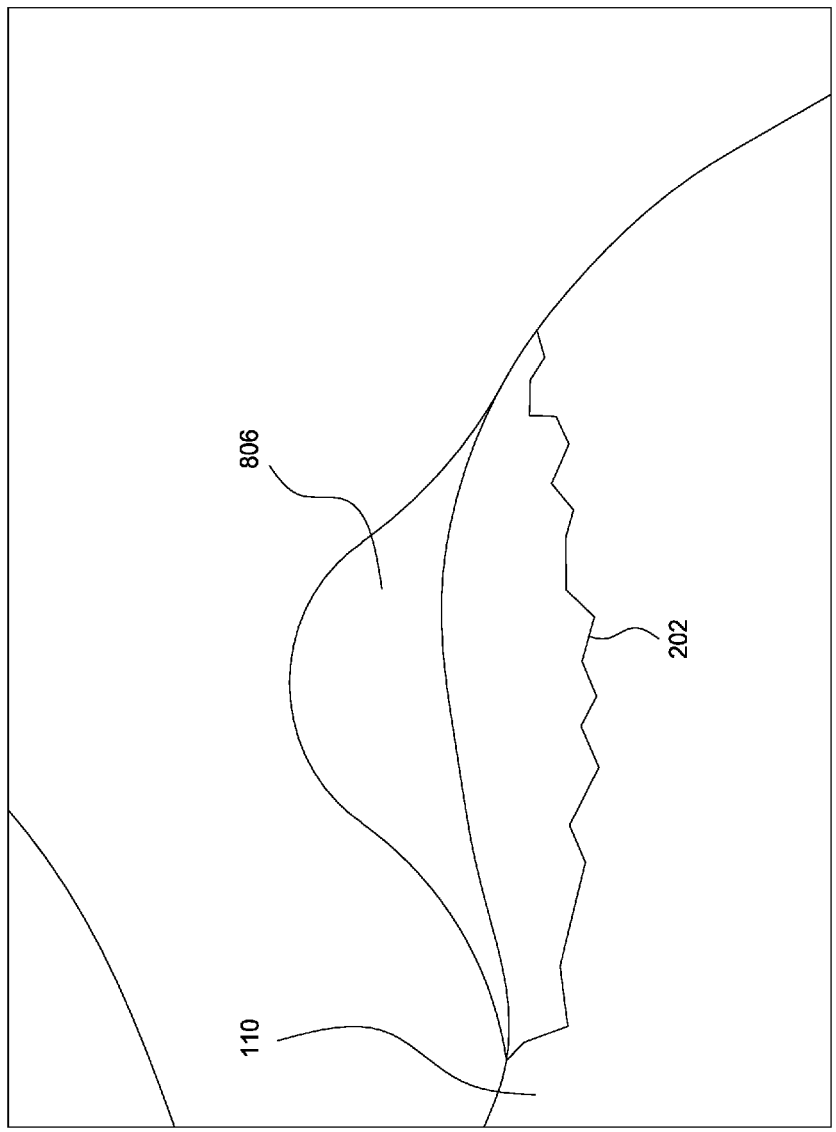

FIG. 8D is a conceptual diagram that illustrates a 3D mesh 806. As shown, 3D mesh 806 is disposed within hole 202 of 3D model 110. Mesh repair engine 112 is configured to generate 3D mesh 806 based on 3D mesh 802 by rotating tangent-normal frames associated with the boundary vertices of 3D mesh 802, thereby causing 3D mesh 802 to "bulge" outwards and assume the shape of 3D mesh 806 shown in FIG. 8D.

In one embodiment of the present invention, at each boundary vertex $V\_i$ a 3D axis X is defined which is parallel to a 3D line from a previous vertex $V\_i-1$ to a subsequent vertex $V\_i+1$. For a given bulge angle A, a standard axis-angle rotation matrix M is defined which specifies a rotation around axis X by the bulge angle A. A set of vectors associated with a tangent-normal frame at $V\_i$ are then transformed via multiplication with this rotation matrix M. Modified tangent-normal frames generated in this fashion are implemented in the deformation technique (also discussed below relative to step 914 in FIG. 9) to control how the interior vertex positions are mapped into 3D space. By altering angle A, the end-user can control the rotation of the initial frames inwards towards the hole center, or outwards away from the hole center, and hence cause the hole-filling surface to "bulge" inwards or outwards.

Mesh repair engine 112 is configured to expose a variety of controls to an end-user of mesh repair engine 112, including controls allowing the end-user to scale the 3D mesh as described above in conjunction with FIG. 8C and controls allowing the end-user to cause 3D mesh 802 to "bulge" into 3D mesh 806. Mesh repair engine 112 may also allow an end-user to interactively modify these parameters of a 3D mesh in real-time.

The multi-step procedure implemented by mesh repair engine 112 described above in conjunction with FIGS. 2-8D is also discussed below in conjunction with FIG. 9.

Figure 9:
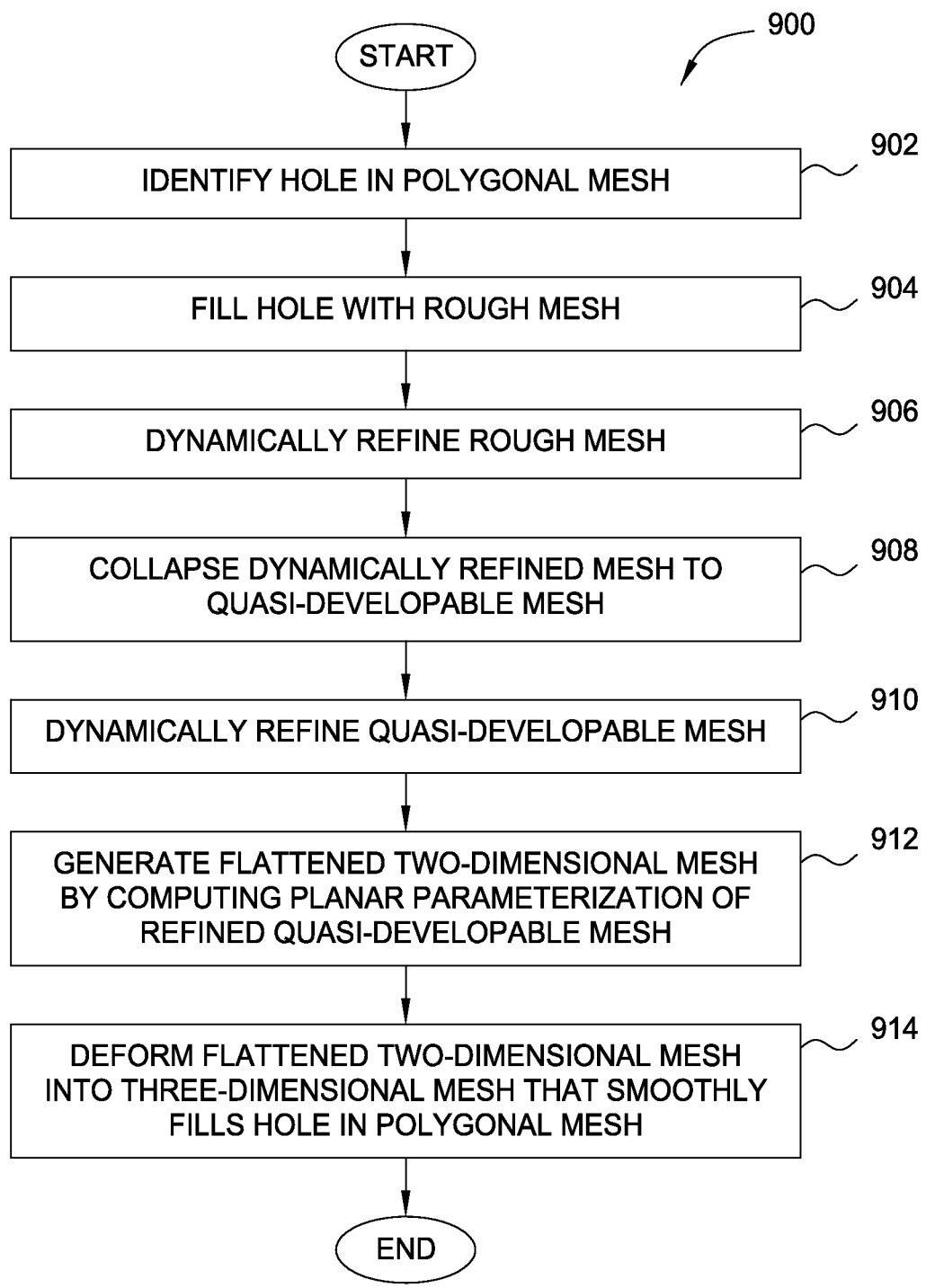
FIG. 9 is a flow diagram of method steps for generating a 3D mesh that fills a hole in a 3D model, according to one embodiment of the invention.

FIG. 9 is a flow diagram of method steps for generating a 3D mesh that fills a hole in a 3D model, according to one embodiment of the invention. Although the method steps are described in conjunction with the system of FIG. 1, persons skilled in the art will understand that any system configured to perform the method steps, in any order, is within the scope of the present invention.

As shown, a method 900 begins at step 902, where mesh repair engine 112 identifies a hole in a 3D model. The hole could be, e.g., hole 202 in 3D model 110 discussed above in conjunction with FIGS. 2-8D. In general, the 3D model is a mesh of polygons that represents the surface of a 3D object, such as, e.g., a human being. The hole in the 3D model may be a region of the 3D model that is not defined by any polygons.

At step 904, mesh repair engine 112 fills the hole with a rough mesh, in similar fashion as described above in conjunction with FIG. 3. The rough mesh could be, e.g., rough mesh 302 shown in FIG. 3. The rough mesh may be a triangle fan or other type of surface that approximately fills the hole. Mesh repair engine 112 could generate the rough mesh by approximating the center of the hole, and then adding edges that connect the approximate center of the hole to boundary vertices that surround the hole.

At step 906, mesh repair engine 112 dynamically refines the rough mesh to generate a dynamically refined rough mesh, in similar fashion as described above in conjunction with FIG. 4. The dynamically refined rough mesh could be, e.g., dynamically refined rough mesh 402 shown in FIG. 4. Mesh repair engine 112 is configured to generate the dynamically refined rough mesh by decomposing each triangle within the rough mesh into a collection of additional, smaller triangles.

At step 908, mesh repair engine 112 collapses vertices within dynamically refined rough mesh to generate a quasi-developable mesh, in similar fashion as described above in conjunction with FIG. 5. The quasi-developable mesh could be, e.g., quasi-developable mesh 502 shown in FIG. 5. Mesh repair engine 112 is configured to alternate between performing edge-collapse operations and edge-flip operations in order to collapse vertices within the dynamically defined rough mesh. Mesh repair engine 112 may also perform a given edge-flip operation only when performing such an operation results in a "flatter" mesh.

At step 910, mesh repair engine 112 dynamically refines quasi-developable mesh to generate a dynamically refined quasi-developable mesh, in similar fashion as described above in conjunction with FIG. 6. The dynamically refined quasi-developable mesh could be, e.g., dynamically refined quasi-developable mesh 602 shown in FIG. 6. Mesh repair engine 112 may implement a similar mesh refinement process as that described above in step 906 in order to generate the dynamically refined quasi-developable mesh.

At step 912, mesh repair engine 112 generates a flattened 2D mesh by computing a planar parameterization of the dynamically refined quasi-developable mesh, in similar fashion as described above in conjunction with FIG. 7. The flattened 2D mesh could be, e.g., flattened 2D mesh 702 shown in FIG. 7. Mesh repair engine 112 may also implement a conformal map when parameterizing the dynamically refined quasi-developable map into two dimensions.

At step 914, mesh repair engine 112 deforms the flattened 2D mesh into a 3D mesh that smoothly fills the hole identified at step 902, in similar fashion as described above in conjunction with FIGS. 8A-8D. The 3D mesh could be, any of 3D meshes 802, 804, or 806 discussed above in conjunction with FIGS. 8A-8B, 8C, and 8D, respectively. Mesh repair engine 112 may implement a "mean-value coordinate" approach in order to generate 3D coordinates for each vertex of the flattened 2D mesh. Once mesh repair engine 112 generates a 3D mesh that fills the hole identified at step 902, the method 900 ends.

In sum, a mesh repair engine is configured to repair a hole in a 3D model by (i) filling the hole with a rough mesh, (ii) refining the rough mesh, (iii) collapsing the refined mesh, (iv) refining the collapsed mesh, (v) flattening the refined, collapsed mesh, and then (vi) deforming the flattened mesh into a 3D surface that smoothly fills the hole in the 3D model.

Advantageously, the mesh repair engine is capable of generating polygons that fill regions of a 3D model that are not defined. Consequently, an end-user of the mesh repair tool is able to generate watertight 3D models from previously incomplete and non-watertight 3D models.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for filling a hole in a three-dimensional (3D) model, the method comprising:
   generating a refined quasi-developable surface that is disposed within the hole in the 3D model;
   generating a two-dimensional (2D) surface based on the refined quasi-developable surface; and
   deforming the 2D surface into a 3D surface that fills the hole in the 3D model.

2. The computer-implemented method of claim 1, wherein generating the refined quasi-developable surface comprises:
   generating a triangle fan that covers the hole in the 3D model;
   generating a refined surface by decomposing each triangle associated with the triangle fan into a first set of refined triangles, wherein each refined triangle in the first set of refined triangles complies with a first geometric criterion;
   generating a quasi-developable surface by flattening the refined surface; and
   generating the refined quasi-developable surface by decomposing each triangle associated with the quasi-developable surface into a second set of refined triangles, wherein each refined triangle in the second set of refined triangles complies with a second geometric criterion.

3. The computer-implemented method of claim 2, wherein the triangle fan comprises a central vertex located approximately equidistant from each boundary vertex that surrounds the hole in the 3D model, and a set of edges that connects the central vertex to each boundary vertex that surrounds the hole in the 3D model.

4. The computer-implemented method of claim 2, wherein the first geometric criterion indicates that each triangle in the first set of refined triangles is substantially equilateral and has a first size, and the second geometric criterion indicates that each triangle in the second set of refined triangles is substantially equilateral and has a second size.

5. The computer-implemented method of claim 2, wherein generating the quasi-developable surface by flattening the refined surface comprises:
   collapsing a first subset of refined triangles included within the first set of refined triangles into a first triangle, wherein triangles in the first subset of triangles reside adjacent to one another within the refined surface;
   collapsing a second subset of refined triangles included within the first set of refined triangles into a second triangle, wherein triangles in the second subset of refined triangles reside adjacent to one another within the refined surface;

determining that inverting the second triangle decreases an angle between a surface normal associated with the first triangle and a surface normal associated with the second triangle; and inverting the second triangle.

6. The computer-implemented method of claim 1, wherein generating the 2D surface based on the refined quasi-developable surface comprises computing a planar parameterization of the quasi-developable surface via a conformal map.

7. The computer-implemented method of claim 1, wherein deforming the 2D surface into the 3D surface that fills the hole in the 3D model comprises:

transforming the 2D surface into a flat 3D surface;

positioning each boundary vertex associated with the flat 3D surface at a location corresponding to a boundary vertex associated with the hole in the 3D model;

generating the 3D surface by projecting each interior vertex associated with the flat 3D surface to a different 3D coordinate based on the locations of the boundary vertices associated with the flat 3D surface.

8. The computer-implemented method of claim 1, further comprising:

generating a scaled 2D surface by scaling one or more edges included within the 2D surface; and deforming the scaled 2D surface into a scaled 3D surface that fills the hole in the 3D model.

9. A non-transitory computer-readable medium storing program instructions that, when executed by a processing unit, cause the processing unit to fill a hole in a three-dimensional (3D) model by performing the steps of:

generating a refined quasi-developable surface that is disposed within the hole in the 3D model;

generating a two-dimensional (2D) surface based on the refined quasi-developable surface; and deforming the 2D surface into a 3D surface that fills the hole in the 3D model.

10. The non-transitory computer-readable medium of claim 9, wherein the step of generating the refined quasi-developable surface comprises:

generating a triangle fan that covers the hole in the 3D model;

generating a refined surface by decomposing each triangle associated with the triangle fan into a first set of refined triangles, wherein each refined triangle in the first set of refined triangles complies with a first geometric criterion;

generating a quasi-developable surface by flattening the refined surface; and generating the refined quasi-developable surface by decomposing each triangle associated with the quasi-developable surface into a second set of refined triangles, wherein each refined triangle in the second set of refined triangles complies with a second geometric criterion.

11. The non-transitory computer-readable medium of claim 10, wherein the triangle fan comprises a central vertex located approximately equidistant from each boundary vertex that surrounds the hole in the 3D model, and a set of edges that connects the central vertex to each boundary vertex that surrounds the hole in the 3D model.

12. The non-transitory computer-readable medium of claim 10, wherein the first geometric criterion indicates that each triangle in the first set of refined triangles is substantially equilateral and has a first size, and the second geometric criterion indicates that each triangle in the second set of refined triangles is substantially equilateral and has a second size.

13. The non-transitory computer-readable medium of claim 10, wherein the step of generating the quasi-developable surface by flattening the refined surface comprises:

collapsing a first subset of refined triangles included within the first set of refined triangles into a first triangle, wherein triangles in the first subset of triangles reside adjacent to one another within the refined surface;

collapsing a second subset of refined triangles included within the first set of refined triangles into a second triangle, wherein triangles in the second subset of refined triangles reside adjacent to one another within the refined surface;

determining that inverting the second triangle decreases an angle between a surface normal associated with the first triangle and a surface normal associated with the second triangle; and inverting the second triangle.

14. The non-transitory computer-readable medium of claim 9, wherein the step of generating the 2D surface based on the refined quasi-developable surface comprises computing a planar parameterization of the quasi-developable surface via a conformal map.

15. The non-transitory computer-readable medium of claim 9, wherein the step of deforming the 2D surface into the 3D surface that fills the hole in the 3D model comprises:

transforming the 2D surface into a flat 3D surface;

positioning each boundary vertex associated with the flat 3D surface at a location corresponding to a boundary vertex associated with the hole in the 3D model;

generating the 3D surface by projecting each interior vertex associated with the flat 3D surface to a different 3D coordinate based on the locations of the boundary vertices associated with the flat 3D surface.

16. The non-transitory computer-readable medium of claim 9, further comprising the steps of:

generating a scaled 2D surface by scaling one or more edges included within the 2D surface; and deforming the scaled 2D surface into a scaled 3D surface that fills the hole in the 3D model.

17. A computing device configured to fill a hole in a three-dimensional (3D) model, including:

a processing unit configured to generate a refined quasi-developable surface that is disposed within the hole in the 3D model;

generate a two-dimensional (2D) surface based on the refined quasi-developable surface; and deform the 2D surface into a 3D surface that fills the hole in the 3D model.

18. The computing device of claim 17, further including:

a memory unit coupled to the processing unit and storing program instruction that, when executed by the processing unit, cause the processing unit to:

identify the hole in the 3D model;

generate the refined quasi-developable surface;

generate the two-dimensional (2D) surface; and deform the 2D surface into the 3D surface that fills the hole in the 3D model.

19. The computing device of claim 17, wherein the processing unit is configured to generate the refined quasi-developable surface by:

generating a triangle fan that covers the hole in the 3D model;

generating a refined surface by decomposing each triangle associated with the triangle fan into a first set of refined triangles, wherein each refined triangle in the first set of refined triangles complies with a first geometric criterion;

generating a quasi-developable surface by flattening the refined surface; and generating the refined quasi-developable surface by decomposing each triangle associated with the quasi-developable surface into a second set of refined triangles, wherein each refined triangle in the second set of refined triangles complies with a second geometric criterion.

20. The computing device of claim 17, wherein the processing unit is configured to deform the 2D surface into the 3D surface that fills the hole in the 3D model by:

transforming the 2D surface into a flat 3D surface;

positioning each boundary vertex associated with the flat 3D surface at a location corresponding to a boundary vertex associated with the hole in the 3D model; and generating the 3D surface by projecting each interior vertex associated with the flat 3D surface to a different 3D coordinate based on the locations of the boundary vertices associated with the flat 3D surface.

\* \* \* \* \*